United States Patent
Arbanas

(10) Patent No.: US 7,823,686 B2
(45) Date of Patent: Nov. 2, 2010

(54) MOTOR VEHICLE STEERING SYSTEM COMPRISING A DIFFERENTIAL DRIVE PROVIDED WITH A SWASH UNIT

(75) Inventor: Viktor Arbanas, Baden (CH)

(73) Assignee: ThyssenKrupp Technologies AG, Essen (DE)

( * ) Notice: Subject to any disclaimer, the term of this patent is extended or adjusted under 35 U.S.C. 154(b) by 247 days.

(21) Appl. No.: 11/666,415

(22) PCT Filed: Oct. 5, 2005

(86) PCT No.: PCT/EP2005/010715

§ 371 (c)(1),
(2), (4) Date: Dec. 30, 2008

(87) PCT Pub. No.: WO2006/048095

PCT Pub. Date: May 11, 2006

(65) Prior Publication Data

US 2009/0200100 A1    Aug. 13, 2009

(30) Foreign Application Priority Data

Oct. 29, 2004   (DE) ....................... 10 2004 052 562

(51) Int. Cl.
*B62D 5/04* (2006.01)
(52) U.S. Cl. ........................ 180/444; 180/443
(58) Field of Classification Search ............. 180/444, 180/443
See application file for complete search history.

(56) References Cited

U.S. PATENT DOCUMENTS 6,026,925 A * 2/2000 Nagao et al. ................ 180/444
6,440,029 B1   8/2002 Battlogg
2003/0021702 A1 * 1/2003 Trousil et al. ............... 417/269

FOREIGN PATENT DOCUMENTS

DE   198 23 721 A1   5/1998
JP   2004-026022     1/2004

* cited by examiner

*Primary Examiner*—Lesley Morris
*Assistant Examiner*—Tashiana Adams
(74) *Attorney, Agent, or Firm*—Crowell & Moring LLP

(57) ABSTRACT

The invention relates to a motor vehicle steering system comprising a differential drive, said differential drive having a carrier structure (12, 33), a drive shaft (3) with a shaft end (3*a*) facing the differential drive, an output unit (2) with a shaft end (2*a*) facing the differential drive, and an auxiliary drive comprising a stator (4) and a rotor (6). The aim of the invention is to simplify the structure of one such differential drive as much as possible. To this end, the shaft end (3*a*) of the drive shaft (3) carries a first toothed disk (7) which is connected to the drive shaft (3) in a rotationally fixed manner, the shaft end (2*a*) of the output unit (2) is connected to at least parts of the carrier structure (12, 33) in a rotationally fixed manner; the carrier structure (12, 33) carries a second toothed disk (8) which is connected thereto in a rotationally fixed manner; and the rotor (6) comprises a first cylindrical section (6*a*) and a second cylindrical section (6*b*) that is bent in relation to the first section (6*a*) at an angle (a). The first section (6*a*) faces the output unit (2) and the second section (6*b*) faces the drive shaft (3). A swash unit (9*a*, 9*b*) arranged on the bent second section (6*b*) couples the two toothed disks (7,8) together in a driving manner.

9 Claims, 4 Drawing Sheets

9a

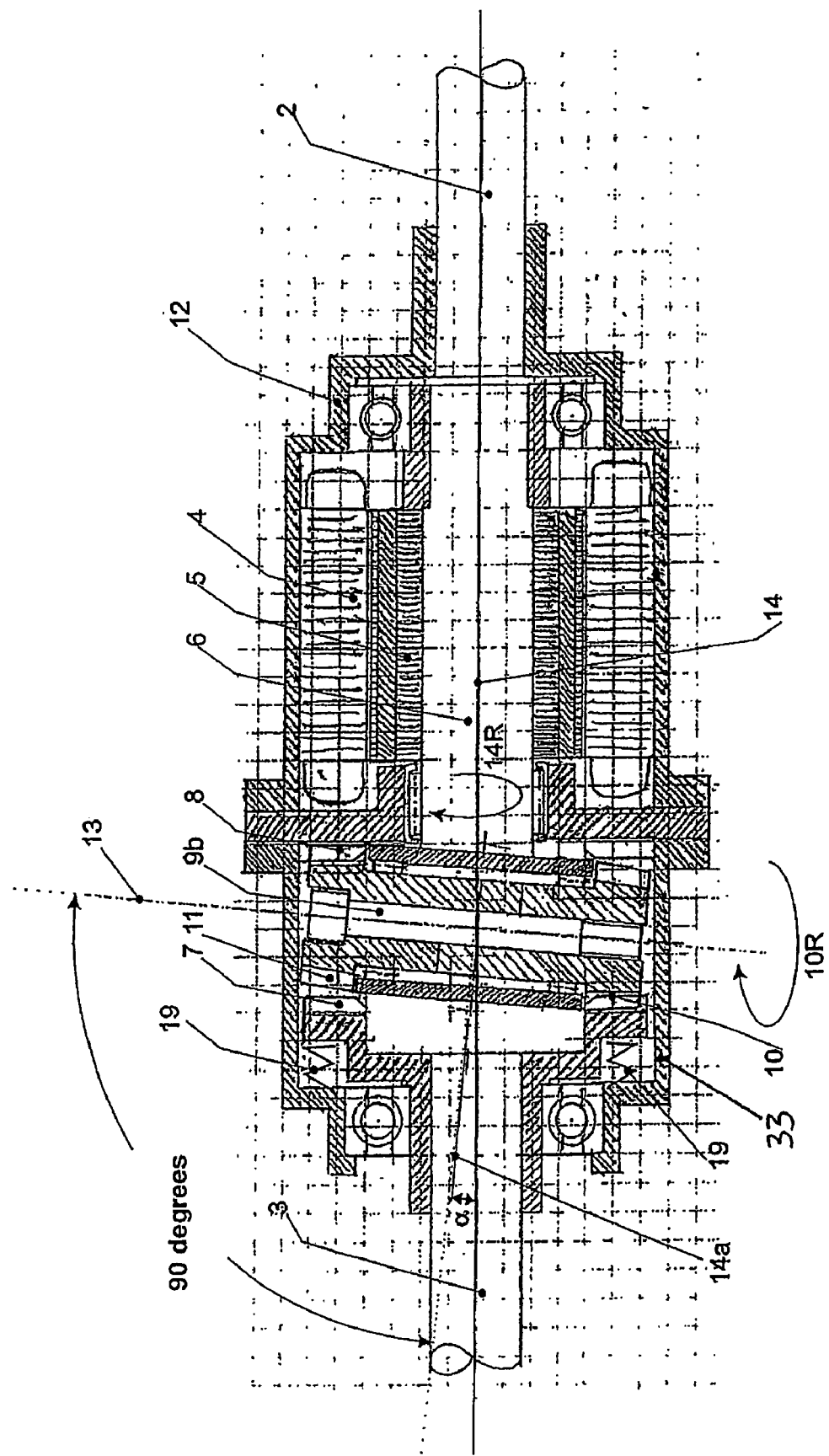

MOTOR VEHICLE STEERING SYSTEM COMPRISING A DIFFERENTIAL DRIVE PROVIDED WITH A SWASH UNIT

The invention relates to a motor vehicle steering system comprising a differential drive according to the preambles of claims 1 and 2.

Motor vehicle steering systems of this type with a differential drive are used in modern steering systems for non-railborne motor vehicles. The electromagnetic auxiliary drive which is provided in such differential drives serves to superimpose the rotations of the differential drive effected by the auxiliary drive upon the control operations carried out by the operator on the steering wheel. In this way the relationship between the rotational speed of the vehicle wheels in comparison to the rotational speed of the steering wheel can be adjusted and can be adapted to the respective travel situation. Thus for example when parking, small angular changes at the steering wheel should lead to large angular turns at the wheels, while in the case of high-speed motorway travel even larger angular changes at the steering wheel should lead to only slight angular turning at the wheels. In some circumstances even automated parking without turning the steering wheel should be made possible. At the same time it is possible in this way by means of the auxiliary drive to exert e.g. a correcting influence on imperfect or excessive steering movements by the driver of the vehicle. Such steering movements requiring correction can occur for example if the driver overreacts to a dangerous situation.

A motor vehicle steering system in accordance with the preamble of claim 1 is known from DE 198 23 721 A1. In the case of this known motor vehicle steering system an upper steering shaft is driven by a motor vehicle steering wheel and via this steering shaft a housing is driven in which are located the teeth of a ring gear of two planet gears. The two planet gears are disposed one behind the other in the axial direction. An electric motor disposed in the housing drives the sun wheel of the first planet gear. The planet carrier of the first planet gear drives the sun wheel of the second planet gear. The planets of the second planet gear are supported on the ring gear of the housing and the planet carrier is connected to the output shaft (lower steering shaft). In the embodiment in accordance with DE 198 23 721 A1 the sun wheel of the first planet gear is driven directly by the rotor of an electric motor. The desired rotational speed transmissions can be produced by corresponding control of the electric motor.

This known solution has some definite disadvantages. The differential drive consists of a large number of individual components. The individual components are very troublesome and expensive to produce. Furthermore, the large number of tooth engagements provided in these differential drives demands relatively high precision requirements in producing the drive parts and in their assembly in order to avoid undesired play in the toothing.

It is the object of the invention to provide a motor vehicle steering system with a differential drive in which the differential drive is easily assembled and the individual drive components can be produced with little effort, with relatively low precision requirements and cost-effectively.

This object is achieved by a motor vehicle steering system with a differential drive, wherein the differential drive has a carrier structure (12, 33), a drive shaft (3) with a shaft end (3a) facing the differential drive, a driven unit (2) with a shaft end (2a) facing the differential drive, and an auxiliary drive comprising a stator (4) and a rotor (6), characterized in that the shaft end (3a) of the drive shaft (3) supports a first toothed disc (7) connected in a non-rotational manner to the drive shaft (3), the shaft end (2a) of the driven unit (2) is connected in a non-rotational manner to at least parts of the carrier structure (12, 33), the carrier structure (12, 33) supports a second toothed disc (8) connected thereto in a non-rotational manner, and the rotor (6) has a first cylindrical portion (6a) and a second second [sic] cylindrical portion (6b) bent by an angle (α) with respect to the first portion (6a), wherein the first portion (6a) faces the driven unit (2) and the second portion (6b) faces the drive shaft (3) and wherein disposed on the angled second portion (6b) is a swash unit (9a, 9b) mounted thereon which drivingly couples the two toothed discs (7, 8) to each other.

This object is also achieved by a motor vehicle steering system with a differential drive, wherein the differential drive has a carrier structure (12, 33), a driven shaft (3) with a shaft end (3a) facing the differential drive, a drive unit (2) with a shaft end (2a) facing the differential drive, and an auxiliary drive comprising a stator (4) and a rotor (6), characterized in that the shaft end (3a) of the driven shaft (3) supports a first toothed disc (7) connected in a non-rotational manner to the driven unit (3), the shaft end (2a) of the drive shaft (2) is connected in a non-rotational manner to at least parts of the carrier structure (12, 33), the carrier structure (12, 33) supports a second toothed disc (8) connected thereto in a non-rotational manner, and the rotor (6) has a first cylindrical portion (6a) and a second second [sic] cylindrical portion (6b) bent by an angle (α) with respect to the first portion (6a), wherein the first portion (6a) faces the drive shaft (2) and the second portion (6b) faces the driven unit (3) and wherein disposed on the angled second portion (6b) is a swash unit (9a, 9b) mounted thereon which drivingly couples the two toothed discs (7, 8) to each other.

Subordinate claims 3 to 9 describe advantageous developments of the invention.

In accordance with the invention a swash unit is disposed between the two mutually opposite and mutually facing sets of toothing of the two toothed discs. The two toothed discs have a different number of teeth so that after rotation of the swash unit the two toothed discs are rotated with respect to each other by an angle which is determined by the ratio of the numbers of teeth on the two toothed discs. If the first toothed disc which is connected in a non-rotational manner to the drive shaft, is held stationary and at the same time the rotor of the auxiliary drive is made to rotate, the swash unit rotatably mounted on the angled portion of the rotor rotates and the second toothed disc, which is in meshing engagement with the swash unit, rotates by precisely this angle for every rotation of the swash unit. A transmission ratio between the rotational speed of the swash unit and the rotational speed of the driven unit can thereby be determined which is designated hereinunder as a transmission ratio of the swash mechanism.

By means of the construction of the differential drive in accordance with the invention it is achieved that as long as the auxiliary drive is not made to move or is blocked, the driving rotational speed is transmitted directly via the first toothed disc, via the swash unit into the second toothed disc and therefore to the driven unit. As soon as the auxiliary drive causes the swash unit to rotate the rotational speeds of the drive shaft and the rotational speed of the rotor transformed by the transmission ratio of the swash mechanism are added together.

From the operating state of the motor vehicle which can be detected by appropriate sensors and which is characterized e.g. by variables such as speed, road condition, desired steering angle, steering angle acceleration and further variables, an engine management system can—in a manner which is known per se—determine defaults for a rotational speed transmission suitable for the respective travel situation and from this derive defaults for control of the auxiliary drive.

The auxiliary drive is preferably formed as an electric motor. A permanently excited synchronous motor has proved particularly suitable as the electric motor, in which synchronous motor the stator with the exciting coils is fixedly connected to the housing of the differential drive and the rotor is disposed inside the stator and is coaxial thereto. Instead of an electric motor other motors can also be used for the auxiliary drive. Thus in the case of the differential drive in accordance with the invention the auxiliary drive can also be driven by a hydraulic or pneumatic drive. The auxiliary drive can be formed for example as an orbital motor or as a reversed vane cell pump.

In the preferred embodiment the whole auxiliary drive, preferably the electric motor, rotates along with the drive shaft.

The invention offers the important advantages over the prior art presented in the introduction (motor vehicle steering system with planet wheel differential drive) that the differential drive consists of significantly fewer components and can thus be constructed substantially more simply. Furthermore, the swash units (swash plates, swash bevel gears) used in accordance with the invention and the toothed discs are substantially simpler to produce than the toothed wheels for planet wheel gears in the known differential drives for motor vehicle steering systems. The precision requirements for the production of these components are lower with the invention than the precision requirements for the toothed wheels of planet wheel gears since with the invention the tolerance chain for the whole path of the turning moment transmission is significantly shorter. A further advantage of the invention is that the drive components transmitting the turning moments can easily be produced e.g. by forging (hot or cold forging) or as sintered components using a sintering technique. Furthermore, the construction is very compact and space-saving.

A safety coupling or a safety circuit is integrated into the differential drive (fail-safe function) in order to ensure direct mechanical coupling between the drive shaft and driven unit and therefore complete control by the driver via the steering system in the event of a fault or in particular vehicle situations—for example in the case of a power failure, computer error or when the ignition is turned off etc. The coupling can be effected for example in an extremely simple manner by blocking the rotor of the auxiliary drive with respect to the stator or the housing of the differential drive.

With respect to the placement of the differential drive within a steering system in accordance with the invention there are different alternative possibilities. On the one hand the differential drive can be disposed between the steering mechanism and the steering wheel. It is also possible to provide the differential drive between the steering mechanism and the steering rods. Furthermore, it is possible to integrate the differential drive into the steering mechanism. Which possibility for placing the differential drive within the steering system is selected depends amongst other things upon the respective conditions with respect to the installation space. Further technical and economic requirements can be decisive in selecting where to place the differential drive. For the case where the differential drive is disposed between the steering mechanism and the steering rod or is integrated into the steering mechanism the driven unit is generally connected directly to a conversion mechanism for converting a turning movement into a translational movement. For example, in this case a ball screw nut of a spherical spindle drive is driven directly.

Alternatively to the coaxial placement of the stator and rotor the auxiliary drive can also be disposed in parallel with the axis of the differential drive and can be coupled to the transmission mechanism via a spur wheel mechanism, worm wheel mechanism, belt mechanism or chain mechanism.

The invention is explained in more detail hereinunder with the aid of a drawing showing two different embodiments, specifically:

FIG. 4 shows a differential drive of a motor vehicle steering system in accordance with the invention in an axial half cross-section in an embodiment differing from FIG. 2.

Figure 1:
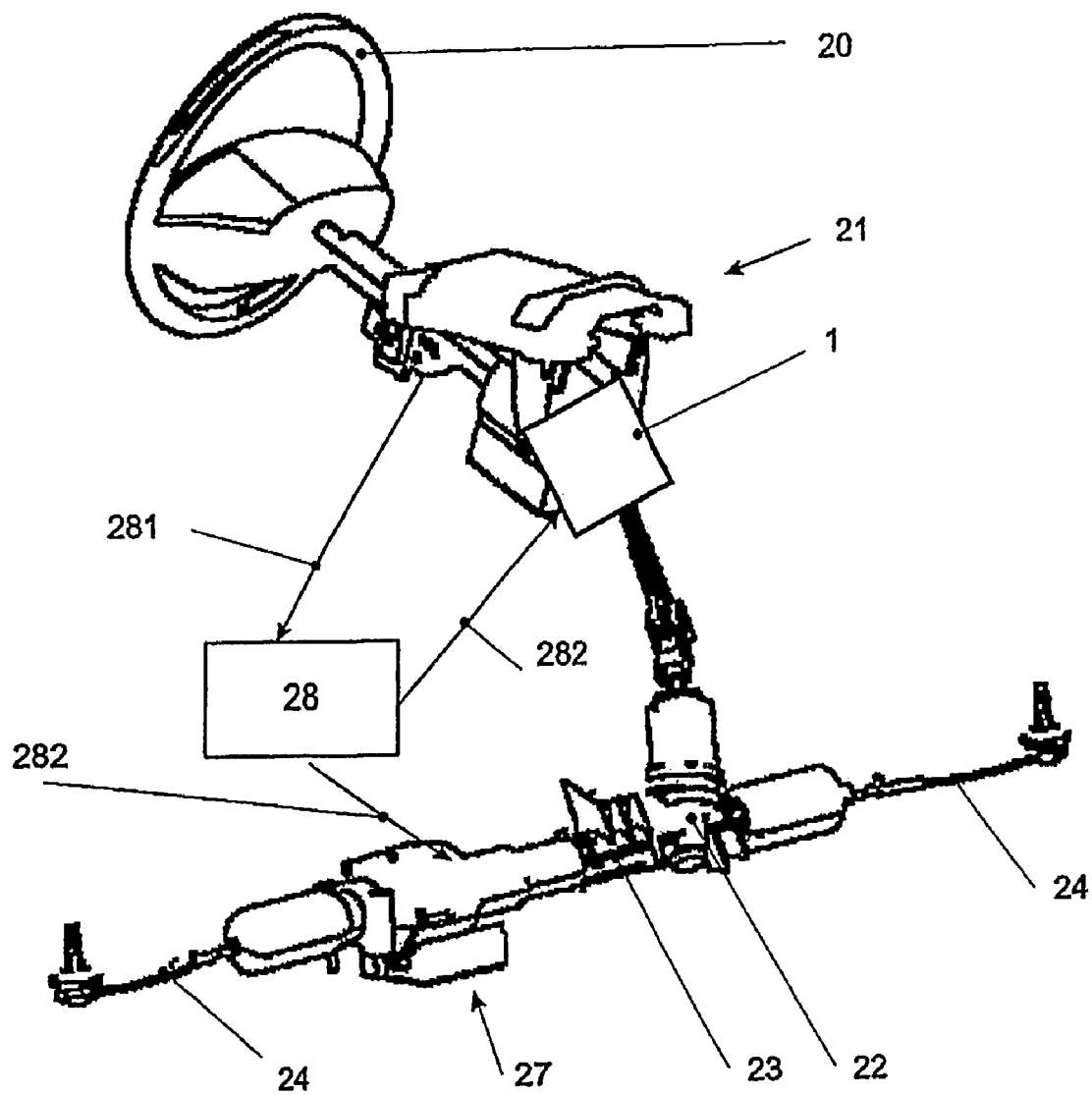
FIG. 1 shows a motor vehicle steering system with a differential drive in accordance with the prior art.

The structure of a steering device 29 shown schematically in FIG. 1 as a steer-by-wire arrangement or a steering device 29 with an electrical power assistance corresponds substantially to the prior art. The illustrated steering device includes amongst other things a steering wheel 20, steering column 21, steering mechanism 22 and the two steering rods 24. The steering rods 24 are driven by the toothed rod 23. The differential drive 1 or 27 in accordance with the invention serves for rotational speed transmission according to the point on the transmission chain from the steering wheel to the steering rods at which the differential drive is to be disposed. It is also possible to integrate the differential drive in accordance with the invention into the steering mechanism 22. This arrangement of the differential drive is not shown in FIG. 1.

The invention is explained in more detail hereinunder with the aid of a steering system with a differential drive which is to be disposed at the location designated by the reference number 1 in FIG. 1. The differential drive described hereinunder is thus preferably disposed between the steering wheel 20 and the steering mechanism 22, for example at the location designated by the reference number 1 in FIG. 1.

In this preferred arrangement of the differential drive the drive shaft 3 driven by the steering wheel 20 and the driven shaft 2 driving the steering pinion of the steering mechanism 22 are disposed coaxially to each other, wherein the end 3a of the drive shaft 3 and the end 2a of the driven shaft 2 are disposed opposite and spaced apart from each other on their common axis of rotation.

In the normal case the steering movement desired by the driver is input as a signal 281 into a control device 28 through the steering wheel 20 via sensors which are not shown in FIG. 1. In the control device 28, possibly with the aid of a sensor signal of the auxiliary drive of the steering system (not shown in this case) and/or of the differential drive and other signals describing the vehicle condition, the corresponding control voltage 282 for the electric motor of the differential drive is determined and output thereto.

With the invention the steering system into which the differential drive is incorporated can be designed with or without power-assisted steering. If power-assisted steering is provided it is of no significance whether this is hydraulic, pneumatic or electric.

Figure 2:
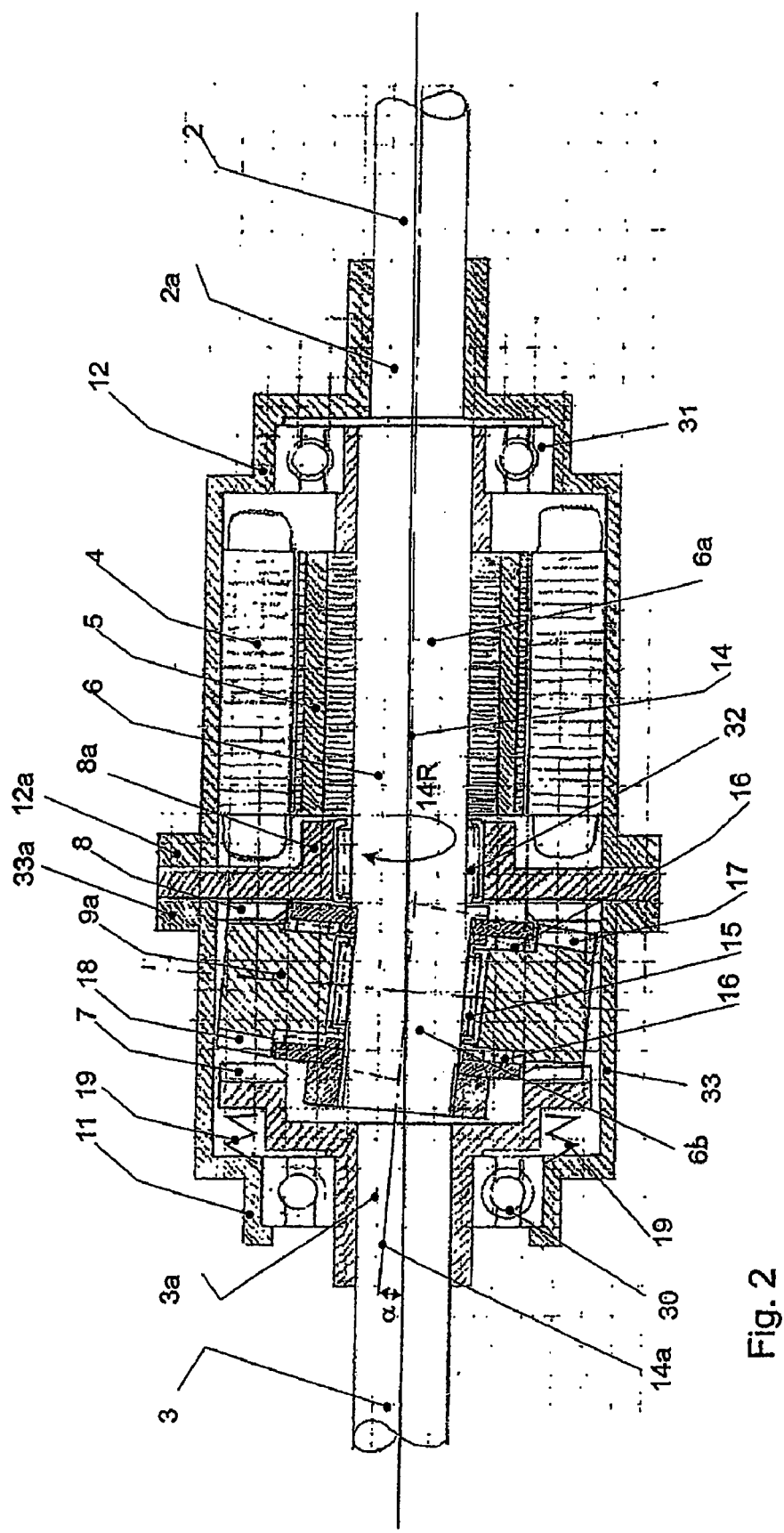
FIG. 2 shows a first embodiment of a differential drive of a motor vehicle steering system in accordance with the invention in an axial half cross-section.

FIG. 2 shows a first embodiment of the differential drive in accordance with the invention in an axial half cross-section. The housing consisting of two housing halves 33, 12 encloses an auxiliary drive which consists of a stator 4 and a rotor 6. The stator 4 is connected in a non-rotational manner to the housing or housing half 12. The shaft end 3a of the drive shaft 3 protrudes into the housing half 33. A toothed disc 7 is disposed in a non-rotational manner on the shaft end 3a. By means of a sleeve-like axial extension of the toothed disc 7, which is disposed coaxially to the shaft end 3a, the drive shaft 3 is mounted together with the toothed disc 7 via a roller bearing 30 so as to be able to rotate with respect to the housing 33, 12. On its periphery the toothed disc 7 has toothing facing away from the shaft end 3a and facing a swash plate 9a.

A driven unit with a driven shaft 2 is disposed coaxial to the drive shaft 3 and is connected in a non-rotational manner to the housing or the housing half 12. At their mutually facing ends the housing halves 33, 12 have radially extending flanges 33a, 12a. A second toothed disc 8 is disposed between these flanges 33a, 12a and connected to them in a non-positive and/or positive and/or materially-bonded manner. The second toothed disc 8 has toothing oriented in the direction of the shaft end 3a of the drive shaft 3 and towards the swash plate 9a. The second toothed disc 8 extends radially as far as the cylindrical portion 6a of the rotor 6. On its end facing the rotor 6 the second toothed disc 8 has an axial flange 8a. Between this flange 8a and the cylindrical portion 6a of the rotor 6 is a needle bearing 32. A roller bearing 31 is disposed on the end of the rotor 6 facing the shaft end 2a of the driven shaft 2. By means of the roller bearing 31 and the needle bearing 32 the rotor 6 is rotatably mounted relative to the housing and relative to the toothed disc 8.

It is clear that the axial flange 8a of the toothed disc 8 and the toothed disc 8 can also be produced as separate components and then connected.

On the end of the rotor 6 facing the drive shaft 3 is a second cylindrical portion 6b of the rotor, which is bent at an angle α with respect to the first cylindrical portion 6a (swash angle α) and forms the swash axis 14a. On this second portion 6b a swash plate 9a is disposed which has two peripheral sets of toothing 17, 18. By disposing the swash plate 9a in this way on the angled portion 6b of the rotor 6 the toothing 17, 18 of the swash plate 9a comes into engagement at the periphery and on mutually opposite sides with the first toothed disc 7 and the second toothed disc 8. In this way the toothed discs 7, 8 are drivingly coupled to each other via the swash plate 9a.

The stator 4 of an electric motor which effects the rotational speed transmission is connected in a non-rotational manner to the housing 12. The electric motor is preferably excited by means of permanent magnets 5. The rotor 6 of the electric motor controls the swash plate 9a which with its toothing 17, 18 brings about the force transfer between the two toothed discs 7, 8 of the drive shaft 3 and the driven shaft 2. The toothed engagement of the swash plate 9a at the periphery changes depending on the rotational angle of the rotor 6.

The swash plate 9a is rotatably mounted on the angled portion 6b of the rotor 6 by means of rollers or a needle bearing 15. By placing the swash plate 9a on the angled portion 6b of the rotor 6 the swash plate 9a rotates when the rotor 6 is caused to rotate. If, for example, the rotor 6 is rotated in the direction of the arrow 14R, the swash plate 9a rotates in the same direction. The toothed engagement between the second toothed disc 8 and the toothing 17 of the swash plate 9a thus moves in the peripheral direction into the plane of the drawing.

The first toothed disc 7 and the second toothed disc 8 differ from each other in terms of their number of teeth. It is thereby achieved that the rotation of the swash plate 9a causes one toothed disc to rotate more quickly than the other toothed disc so that typical high transmission ratios are achieved for such swash mechanisms.

Figure 3:
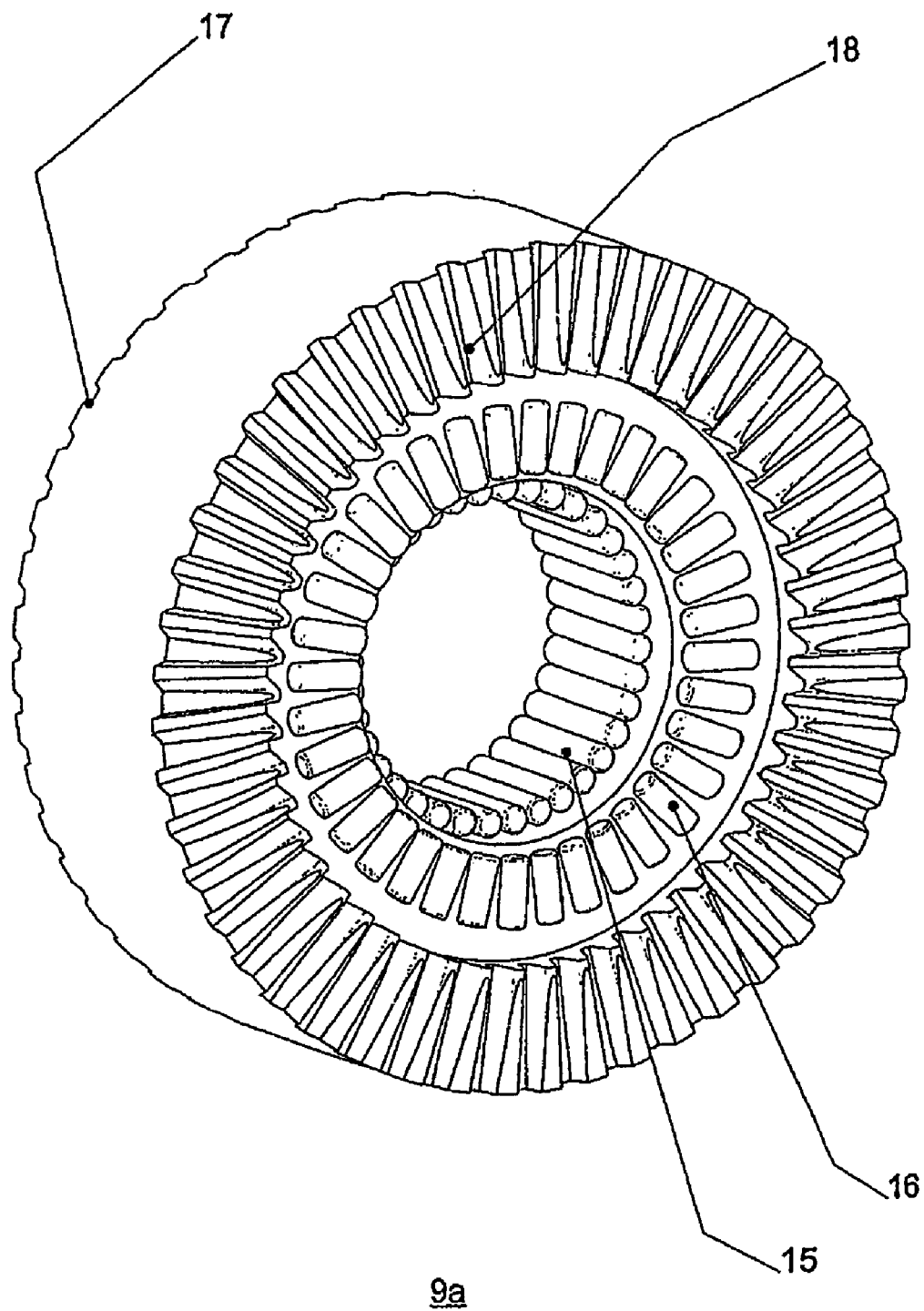
FIG. 3 shows a perspective view of a swash unit formed as a double-toothed swash plate.

FIG. 3 shows the swash plate 9a as a single part in a perspective view. On its periphery the swash plate 9a has two sets of toothing 17, 18 which lie opposite each other in the axial direction and which, in use as shown in FIG. 2, are engaged with the mutually opposite toothed discs 7, 8. By means of the rollers 15, which are provided on the inner periphery of the swash plate 9a, this swash plate is rotatably mounted on the angled portion 6b of the rotor 6 (cf. FIG. 2). Rollers 16 are also provided on the peripheral surface of the swash plate 9a and ensure free rotation of the swash plate 9a on the angled portion 6b of the rotor 6.

FIG. 4 shows an embodiment of the invention which is different from FIG. 2. This second embodiment of the invention in accordance with FIG. 4 differs from the first embodiment in FIG. 2 only at a few points. In this case the swash unit 9b is formed by two toothed wheels formed as swash bevel gears 10, 11. The toothing of the first swash bevel gear 10 engages into the first toothed disc 7. The second swash bevel gear 11 engages into the second toothed disc 8. The two swash bevel gears 10, 11 are disposed in a non-rotational manner with respect to each other and both mounted on the angled portion 6b of the rotor 6.

If the drive shaft 3 is held rigid and the rotor 6 is rotated in the rotational direction of arrow 14R, the swash bevel gears 10 and 11 also rotate about their own longitudinal axis 13 in the rotational direction of the arrow 10R in the example of FIG. 4. The longitudinal axis 13 of the swash bevel gears 10, 11 which are connected to each other in a non-rotational manner is oriented orthogonal to the swash axis 14a, i.e. the axis which is angled by the swash angle with respect to the axis of rotation 14 of the rotor 6. In this second embodiment the rotation of the swash bevel gears 10, 11 causes the toothed engagement with the toothed discs 7, 8 to change in the peripheral direction. A corresponding transformation is achieved by the toothed disc 7 and toothed disc 8 having a different number of teeth.

In both of the exemplified embodiments described above it is in principle of no importance which teeth number ratios are used to achieve the required rotational speed transmission. It is also possible to achieve the rotational speed transmission by different numbers of teeth on the swash bevel gears 10, 11 (FIG. 4) or by different swash plate toothing 17, 18 of the swash plate 9a (FIG. 2) or a combination of different numbers of teeth on the drivingly coupled toothed elements. The design can be determined using the methods of transmission and toothing design known to the person skilled in the art.

It will be understood that in all embodiments the toothing of the toothed discs and/or of the swash unit with special toothing can be formed for example in order to increase the degree of effectiveness or to reduce noise.

These embodiments of the differential drive offer further advantages and permit particularly simple construction of the device. In particular it is possible to compensate for play very easily by using spring elements 19 which bring the toothing into deeper engagement and keep it there. In so doing the resilience can be directed in the direction of the swash angle α or in the direction of the axial translation along the common axis of rotation of the drive shaft 3 and driven shaft 2 as shown in FIGS. 2 and 4 of the two toothed discs. The toothing is consequently kept in engagement under pretensioning by elastic or resilient elements in order to compensate for play. The requirements placed on the rotation of the two toothed discs are also less stringent than in the case of the toothed wheels which are used in the differential drives known from the prior art, for example for a planet wheel gear. Thus with the invention the toothing partners can be produced by forging or sintering without mechanical post processing or with only slight mechanical post processing.

It will also be understood that the arrangement shown in the exemplified embodiments of FIGS. 2 and 4 can also be changed in such a way that the shaft 3 designated as a drive shaft in FIGS. 2 and 4 is the driven shaft and the shaft 2 designated as the driven shaft in FIGS. 2 and 4 is the drive shaft, i.e. the shaft connected to the steering wheel. In this case the number of teeth on the toothed discs and the toothing on the swash units are to be adapted accordingly.

It is also clear that the housing 33, 12 can also be of a different supporting structure which ensures the guidance and mounting of the corresponding [lacuna]. This supporting structure or the housing can in principle be formed as one piece or in a number of pieces. In particular, it is also feasible to dispose the plane of separation of the housing shown in the examples in the direction of the axis of rotation of the driven shaft 2 rather than orthogonally.

As expressed in the independent claims by the term "driven unit" this component does not necessarily have to be a driven shaft. It is also feasible that in the case of the invention the driven unit be formed in such a way that the housing part 12 can convert a rotational movement directly into a translational movement. This can take place, e.g. by means of a spherical spindle drive which is actuated by the housing half 12. This embodiment alternative is particularly useful when the driven unit is coupled e.g. directly to the steering rods 24 of the steering system.

REFERENCE LIST

1. Differential device
2. Driven shaft
2a. Shaft end
3. Drive shaft
3a. Shaft end
4. Stator
5. Permanent magnets
6. Rotor
6a. First cylindrical portion
6b. Second cylindrical portion
7. First toothed disc
8. Second toothed disc
8a. Axial flange
9a. Swash plate
9b. Swash gear
10. Swash bevel gear
10R. Arrow (rotational direction of swash bevel gear)
11. Swash bevel gear
12. Housing part
12a. Flange
13. Longitudinal axis
14. Longitudinal axis, stator axis
14a. Swash axis
14R. Arrow (direction of rotation of rotor)
15. Bearing
16. Bearing
17. Swash gear toothing
18. Swash gear toothing
19. Spring element
20. Steering wheel
21. Steering column
22. Steering mechanism
23. Toothed rod
24. Steering rod
27. Differential device
28. Control device
29. Steering device
30. Roller bearing
31. Roller bearing
32. Needle bearing
33. Housing part
33a. Flange
281. Signal of driver's wish
282. Control voltage of electric motor
α Swash angle

The invention claimed is:

1. Motor vehicle steering system with a differential drive, wherein the differential drive has a carrier structure, a drive shaft with a shaft end facing the differential drive, a driven unit with a shaft end facing the differential drive, and an auxiliary drive comprising a stator and a rotor, wherein •the shaft end of the drive shaft supports a first toothed disc connected in a non-rotational manner to the drive shaft, •the shaft end of the driven shaft is connected in a non-rotational manner to at least parts of the carrier structure ,•the carrier structure supports a second toothed disc connected thereto in a non-rotational manner, and •the rotor has a first cylindrical portion and a second cylindrical portion bent by an angle with respect to the first portion , wherein the first portion faces the driven shaft and the second portion faces the drive shaft and wherein disposed on the angled second portion is a swash unit mounted thereon which drivingly couples the two toothed discs to each other.

2. Motor vehicle steering system with a differential drive, wherein the differential drive has a carrier structure , a driven shaft with a shaft end facing the differential drive, a drive unit with a shaft end facing the differential drive, and an auxiliary drive comprising a stator and a rotor, wherein •the shaft end of the driven shaft supports a first toothed disc connected in a non-rotational manner to the driven shaft, •the shaft end of the drive shaft is connected in a non-rotational manner to at least parts of the carrier structure ,•the carrier structure supports a second toothed disc connected thereto in a non-rotational manner, and •the rotor has a first cylindrical portion and a second cylindrical portion bent by an angle with respect to the first portion , wherein the first portion faces the drive shaft and the second portion faces the driven shaft and wherein disposed on the angled second portion is a swash unit mounted thereon which drivingly couples the two toothed discs to each other.

3. Motor vehicle steering system as claimed in claim 1, wherein the carrier structure is formed from at least two housing parts.

4. Motor vehicle steering system as claimed in claim 3, wherein the housing halves have flanges on their mutually facing ends and in its radial outer region the second toothed disc is connected in a non-rotational manner at least to the flange(12a) of the housing half.

5. Motor vehicle steering system as claimed in claim 1, wherein the second toothed disc is connected on a positive and/or no-positive manner to the two housing halves.

6. Motor vehicle steering system as claimed in claim 1, wherein the drive shaft and the driven shaft are disposed coaxially to each other.

7. Motor vehicle steering system as claimed in claim 1, wherein the swash unit is formed as a swash disc with peripheral sets of toothing lying axially opposite each other, wherein one set of toothing is engaged with the second toothed disc and the other set of toothing is engaged with the first toothed disc.

8. Motor vehicle steering system as claimed in claim 1, characterized in that the swash unit has two swash bevel gears which are rotationally fixed with respect to each other and which are rotatably mounted on the angled second portion of the rotor, wherein the toothing of the swash bevel gear facing the first toothed disc is engaged with the first toothed disc and the toothing of the swash bevel gear facing the second toothed disc is engaged with the second toothed disc.

9. Motor vehicle steering system as claimed in claim 1, wherein in order to compensate for play between the swash unit and the toothed discs elastic and/or resilient compensation elements are provided by means of which the sets of toothing are held in engagement with each other under pretensioning.

* * * * *